US007246193B2

(12) United States Patent
Rotvold et al.

(10) Patent No.: US 7,246,193 B2
(45) Date of Patent: Jul. 17, 2007

(54) INTERFACE MODULE FOR USE WITH A MODBUS DEVICE NETWORK AND A FIELDBUS DEVICE NETWORK

(75) Inventors: Eric D. Rotvold, Inner Grove Heights, MN (US); Donald R. Lattimer, Chaska, MN (US); Michael J. Green, Plymouth, MN (US); Robert J. Karschnia, Chaska, MN (US); Marcos A. V. Peluso, Chanhassen, MN (US)

(73) Assignee: Rosemount, Inc., Eden Prairie, MN (US)

( * ) Notice: Subject to any disclaimer, the term of this patent is extended or adjusted under 35 U.S.C. 154(b) by 112 days.

(21) Appl. No.: 10/354,525

(22) Filed: Jan. 30, 2003

(65) Prior Publication Data

US 2004/0153594 A1 Aug. 5, 2004

(51) Int. Cl.
*G06F 13/36* (2006.01)
*G06F 13/20* (2006.01)
*G06F 13/10* (2006.01)
*G06F 13/40* (2006.01)

(52) U.S. Cl. .................. 710/311; 710/305; 710/310

(58) Field of Classification Search ............ 710/305, 710/306, 311, 315
See application file for complete search history.

(56) References Cited

U.S. PATENT DOCUMENTS

| | | | |
|---|---|---|---|
| 5,410,730 A | | 4/1995 | Longsdorf et al. |
| 5,764,155 A | * | 6/1998 | Kertesz et al. ............. 700/295 |
| 5,903,455 A | * | 5/1999 | Sharpe et al. ................. 700/83 |
| 6,301,527 B1 | * | 10/2001 | Butland et al. ............. 700/286 |
| 6,434,157 B1 | * | 8/2002 | Dube' et al. ................. 370/401 |
| 6,618,745 B2 | * | 9/2003 | Christensen et al. ........ 709/201 |
| 6,631,298 B1 | * | 10/2003 | Pagnano et al. .............. 700/19 |
| 6,760,782 B1 | * | 7/2004 | Swales ........................ 709/250 |
| 6,839,790 B2 | * | 1/2005 | Barros De Almeida et al. . 710/305 |
| 7,181,515 B2 | * | 2/2007 | Lin et al. ..................... 709/223 |
| 2004/0054829 A1 | * | 3/2004 | White et al. ................. 710/105 |
| 2004/0070599 A1 | * | 4/2004 | Mori et al. .................. 345/735 |

OTHER PUBLICATIONS

Smar International; "Smar: First in Fieldbus"; Smar International; Aug. 14, 2002; available online at <https://www.smar.com/shownews.asp?Id=22>.*

(Continued)

*Primary Examiner*—Paul R. Myers
*Assistant Examiner*—Ryan Stiglic
(74) *Attorney, Agent, or Firm*—Marshall, Gerstein & Borun LLP

(57) ABSTRACT

An interface module is operatively coupled to a Fieldbus process control network and a Modbus process control network to facilitate the exchange of process control information between the networks. The interface module stores a register map database in which the process control parameters of the function blocks in the field devices of the Fieldbus process control network are mapped to register numbers of the Modbus process control network. Once the Fieldbus process control parameters are mapped to the Modbus registers, the interface module is adapted to transmit request messages on the Fieldbus process control network to the Fieldbus field devices for the current values of the process control parameters, receive response messages from the Fieldbus field devices, and store the current values of the process control parameters in the register map database.

27 Claims, 3 Drawing Sheets

OTHER PUBLICATIONS

Smar International; "DFI302 Fieldbus Universal Bridge"; Smar International; available at least by Aug. 14, 2002; pp. 2-35.*

Sena Technologies; "Introduction to MODBUS; Technical Tutorial"; Sena Technologies; Dec. 6, 2002; pp. 1-10.*

Smar International; "SYSTEM302 Enterprise Automation: A Foundation Fieldbus System"; Smar International; available at least by Aug. 14, 2002; pp. 1-36.*

Lovashov et al.; "Applicability of Internet Protocols for Fieldbus Access"; IEEE; 4th IEEE International Workshop on Factory Communication Systems, Västerås, Sweden; Aug. 30, 2002; pp. 205-213.*

Valve-Wold; "Foundation Fieldbus linked to high-speed Ethernet"; Nov. 11, 2001; available online at <http://www.valve-world.net/projects/news_fullstory.asp?NewsID=1435>.*

Softing; "FG-300 Fieldbus Gateway"; Softing; Nov. 2002; available online at <http://www.softing.com/en/pdf/communications/fieldgate/D_IA_04E_0211_FG-300_Z.pdf>.*

Fieldbus Facts Online; "Discrete I/O in FOUNDATION fieldbus"; Sep. 2002; vol. 3, No. 9; available online at <http://www.fieldbus.org/fieldbusfacts/september2002/fieldbusfactssept02.html>.*

Control Engineering; "Comact Ethernet-to-fieldbus gateway"; Control Engineering; Sep 1, 2000; available online at <http://www.manufacturing.net/ctl/article/CA211641>.*

Smar; "DF1302 User's Manual Fieldbus Universal Bridge"; Smar; May 2002.*

International Search Report, International Application No. PCT/US2004/002395, search completed Jul. 28, 2004.

Written Opinion of the International Searching Authority, dated Jul. 28, 2004.

MKS Instruments, Inc., Wilmington, MA, "CDN067-3 Devicenet Specifications; Revision 1.3," Aug. 4, 1997, Internet URL: http://www.mksinst.com/pdf/dipcdn0673dnspec.pdf, pp. 1, 4-5 and 9-11.

Watlow Electric Manufacturing Co., Winong, MN, "CDN Gateway; Application Note," Mar. 2002, Internet URL: http://www.watlow.com/literature/prodtechinfo/files/controllers/cdne_b.pdf, pp. 3 and 7-10.

Deutschmann Automation GMBH, Bad Camberg, Germany, "User Manual: Universal Fieldbus-Gateway Unigate®," Oct. 26, 2000, Internet URL: http://www.deutschmann.de/English/download/manuals/gateway/uni_an_e.pdf, Sections 13.2-13.3.

Sveda M et al., "Interconnecting Low-Level Fieldbusses," Euromicro 97: New Frontiers of Information Technology., Proceedings of the 23$^{rd}$ Euromicro Conference, Budapest, Hungary, Sep. 1-4, 1997, IEEE Computer Society, Los Alamitos, CA, Sep. 1, 1997, pp. 614-620, ISBN: 0-8186-8129-2.

International Search Report, International Application No. PCT/US2005/030765, mailed Mar. 1, 2006.

Written Opinion of the International Searching Authority, mailed Mar. 1, 2006.

"Buses and the DeltaV System," Jan. 2002, Internet URL: http://www.easydeltav.com/pd/wp_busses.pdf#search='buses%20and%20the%20DeltaV%20 System'>, pp. 1-8.

"System302 Enterprise Automation—Connecting to the Future," SMAR Industrial Automation, Sep. 15, 2003, downloadable at http://www.smar.com/System302/index.asp, Presentations tab, 138 pages.

http://www.smar.com/System302/index.asp, Aug. 22, 2006, 2 pages.

* cited by examiner

FIG. 3

| Modbus Register Number | Segment Number | Field Device Number | Function Block Number | Parameter | Value |
|---|---|---|---|---|---|
| | | | Fieldbus Process Control Network 14 | | |
| 45001 | 1 | 848-01 | TT-01-1 | Output Status | 28 |
| 45002 | 1 | 848-01 | TT-01-2 | Output Status | 128 |
| 45003 | 1 | 848-01 | TT-01-3 | Output Status | 128 |
| 45004 | 1 | 848-02 | TT-02-1 | Output Status | 128 |
| 45305 | 2 | 848-39 | TT-39-1 | Output Status | 128 |
| 45306 | 2 | 848-39 | TT-39-2 | Output Status | 128 |
| 45307 | 2 | 848-40 | TT-40-1 | Output Status | 128 |
| 45308 | 2 | 848-40 | TT-40-3 | Output Status | 128 |
| 45321 | 3 | 3051-41 | PP-41-1 | Output Status | 128 |
| 45322 | 3 | 3051-42 | PP-42-1 | Output Status | 128 |
| 45323 | 3 | 3051-43 | PP-43-1 | Output Status | 128 |
| 45324 | 3 | 3051-44 | PP-44-1 | Output Status | 128 |
| 47001 | 1 | 848-01 | TT-01-1 | Output Value | |
| 47003 | 1 | 848-01 | TT-01-2 | Output Value | 10.0 |
| 47005 | 1 | 848-01 | TT-01-3 | Output Value | 45.0 |
| 47007 | 1 | 848-02 | TT-02-1 | Output Value | 25.0 |
| 47609 | 2 | 848-39 | TT-39-1 | Output Value | 55.0 |
| 47610 | 2 | 848-39 | TT-39-2 | Output Value | 56.0 |
| 47625 | 2 | 848-40 | TT-40-1 | Output Value | 15.0 |
| 47629 | 2 | 848-40 | TT-40-3 | Output Value | 15.0 |
| 47641 | 3 | 3051-41 | PP-41-1 | Output Value | 300.0 |
| 47643 | 3 | 3051-42 | PP-42-1 | Output Value | 305.0 |
| 47645 | 3 | 3051-43 | PP-43-1 | Output Value | 80.0 |
| 47647 | 3 | 3051-44 | PP-44-1 | Output Value | 82.0 |

INTERFACE MODULE FOR USE WITH A MODBUS DEVICE NETWORK AND A FIELDBUS DEVICE NETWORK

FIELD OF THE INVENTION

The present invention relates generally to process control systems and, more particularly, to an interface module for exchanging data between a Fieldbus device network and a Modbus device network.

DESCRIPTION OF THE RELATED ART

Process control systems, like those used in chemical, petroleum or other processes, typically include at least one centralized process controller communicatively coupled to at least one host or operator workstation and to one or more field devices via analog and/or digital buses or other communication lines or channels. The field devices, which may be, for example, valves, valve positioners, switches, transmitters (e.g., temperature, pressure and flow rate sensors), etc. perform functions within the process such as opening or closing valves and measuring process parameters. The process controller receives signals indicative of process measurements made by the field devices and/or other information pertaining to the field devices via an input/output (I/O) device, uses this information to implement a control routine and then generates control signals which are sent over the buses or other communication channels via the input/output device to the field devices to control the operation of the process. Information from the field devices and the controller is typically made available to one or more applications executed by the operator workstation to enable an operator to perform any desired function with respect to the process, such as viewing the current state of the process, modifying the operation of the process, configuring the process, documenting the process, etc.

In the past, standard communication protocols were developed to enable controllers and field devices from different manufacturers to exchange data using standard formats. One such standard communication protocol, the Modbus protocol, has been in use in process control systems for more than twenty years. The Modbus protocol defines a message structure that controllers will recognize and use regardless of the types of networks over which they communicate. It establishes a common format for the layout and content of message fields. Modbus defines a process for the controllers to request access to other devices, for the controllers and devices to respond to requests, and for error detection and reporting. During communications on a Modbus network, the protocol determines how each controller or device will know its device address, recognize a message addressed to it, determine the kind of action to be taken, and extract any data or other information contained in the message. If a reply is required, the controller or device will construct the reply message and send it using the Modbus protocol. The Modbus protocol is known in the art and is described in detail in numerous articles, brochures and specifications published, distributed and available from, among others, manufacturers of devices using the Modbus protocol. As a result, the details of the Modbus communication protocol will not be described in detail except to the extent they relate to the present invention.

Modbus employs a master-slave query-response cycle for exchanging information between controllers and field devices. Each device is assigned an address ranging between 1 and 255. One device, the master, initiates transactions, such as queries, set point changes, diagnostics, and the like, by transmitting a message addressed to another device, the slave. Under the Modbus protocol, the message transmitted by the master is formatted to include the device address of the slave device, a function code defining the requested action, any data to be sent to the slave device, and error-checking information. The slave device detects and receives the message from the master based on the address in the message, and processes the transaction or function indicated by the function code in the message. After processing the transaction or performing the requested function, the slave transmits a response message constructed using the Modbus protocol and containing information confirming the action taken, any data to be returned to the master, and error-checking information. The Modbus protocol supports both an ASCII mode wherein messages are transmitted as ASCII characters, and an RTU mode wherein messages are transmitted as hexadecimal characters.

Data is exchanged between devices in the Modbus network using register numbers. Each process control parameter used in the Modbus network is assigned a numeric register number within a set range of available register numbers. The devices in the Modbus network are configured to store and exchange the process control parameters according to their assigned register number. In order to obtain the value of a process control parameter from a slave device, a master device formats and transmits a request message including the address of the slave device and the register number for the process control parameter. Upon receiving the request message, the slave device reads the current value for the register number, and formats and transfers a response message with the register number and stored value.

In the past decade or so, smart field devices including a microprocessor and a memory have become prevalent in the process control industry. In addition to performing a primary function within the process, smart field devices may store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, Actuator Sensor Interface (hereinafter "AS-Interface" or "ASI"), WORLDFIP®, Device-Net®), CAN, and FOUNDATION™ Fieldbus (hereinafter "Fieldbus") protocols, and have been developed to enable smart field devices made by different manufacturers to be used together within the same process control network.

Generally speaking, the Fieldbus protocol is an all-digital, serial, two-way communication protocol that provides a standardized physical interface to a two-wire loop or bus that interconnects field devices. The Fieldbus protocol provides, in effect, a local area network for field devices within a process, which enables these field devices to perform process control functions (using function blocks) at locations distributed throughout a process facility and to communicate with one another before and after the performance of these process control functions to implement an overall control strategy. The Fieldbus protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein except to the extent they relate to the present invention.

A Fieldbus process control network may include one or more interconnected Fieldbus segments, with each segment having one or more field devices, linked together via a bus. For communication to occur, one of the devices on each segment of the bus operates as a link active scheduler (LAS) that actively schedules and controls communication on the associated segment of the bus. The LAS for each segment of the bus stores and updates a communication schedule (a link active schedule) containing the times that each function block of each device is scheduled to start periodic communication activity on the bus and the length of time for which this communication activity is to occur. The LAS also controls asynchronous communication activities that may occur when no synchronous communication is taking place on the bus segment. During the time that synchronous communication is not occurring, each field device is allowed, in turn upon receipt of a pass token message from the LAS, to transmit alarm data, view data, etc. in an asynchronous manner.

Under the Fieldbus protocol, field devices are able to communicate with each other over a bus using unique addresses that are assigned to each field device. The field devices are attached to nodes of the bus, and each node has a designated physical address that identifies the field device attached thereto for use in communicating with the other field devices in the process control network. The unique address for the field device is included in the messages published by the device on the bus. The field device or devices to which the messages are published are configured to listen to the bus segment to which it is connected for messages containing the address of the publishing field device. When the subscribing field devices detect messages with the address of the publishing field device, they decode and process the messages as necessary to effect process control.

Field devices are able to publish or transmit data and messages over the bus using one of three types of virtual communication relationships (VCRs) defined in each field device. A client/server VCR is used for queued, unscheduled, user initiated, one to one, communications between devices on the bus. A field device may use a client/server VCR when it receives a pass token message from an LAS to send a request message to another device on the bus. The requester is called the "client" and the device that receives the request is called the "server." The server sends a response when it receives a pass token message from the LAS and processes the client's request. The client/server VCR is used, for example, to effect operator initiated requests such as set point changes, tuning parameter access and changes, alarm acknowledgments, and device uploads and downloads.

A report distribution VCR is used for queued, unscheduled, user initiated, one too many communications. For example, when a field device with an event or a trend report receives a pass token from an LAS, that field device sends its message to a "group address" defined in the device. Devices that are configured to listen on that VCR will receive the report. The report distribution VCR type is typically used by Fieldbus devices to send alarm notifications to operator consoles.

Finally, a publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus when the publisher device receives a compel data message from the LAS or from a subscriber device. The publisher/subscriber relationships are predetermined and are defined and stored within each field device.

As previously indicated, the Modbus protocol has been in use in process control systems for more than twenty years, while the Fieldbus protocol has been developed and implemented in process control systems more recently. As a result, conditions may arise wherein process control networks using the Modbus protocol may co-exist with process control networks using the Fieldbus protocol in the same plant or facility. For example, an installation having process control networks operating under the Modbus protocol may convert a portion of the process control network to operate under the Fieldbus protocol in order to implement a particular control strategy that is supportable by the Fieldbus protocol. However, despite the partial conversion, the Modbus portion of the process control network may still require information and data from the Fieldbus portion of the process control network. As a further example, a plant or facility with an existing process control network operating under the Modbus protocol may be expanded to include additional processes having process control networks operating under the Fieldbus protocol. As with the previous example, it may be necessary to communicate data and information from the Fieldbus network to the Modbus network. In current implementations, data cannot be communicated directly from a Fieldbus device to a Modbus device. Therefore, a need exists for an interface module that may be connected between a Modbus process control network and a Fieldbus process control network to allow information and data from the Fieldbus network to be communicated to devices in the Modbus process control network.

SUMMARY OF THE INVENTION

An interface module is operatively coupled to a Fieldbus process control network and a Modbus process control network to facilitate the exchange of process control information between the networks. The interface module stores a register map database in which the process control parameters of the function blocks in the field devices of the Fieldbus process control network are mapped to register numbers of the Modbus process control network. Once the Fieldbus process control parameters are mapped to the Modbus registers, the interface module is adapted to transmit request messages on the Fieldbus process control network to the Fieldbus field devices for the current values of the process control parameters, receive response messages from the Fieldbus field devices, and store the current values of the process control parameters in the register map database.

Master devices in the Modbus process control network may obtain the values of the Fieldbus process control parameters by transmitting request messages to the interface module for the current values of the Modbus registers to which the process control parameters have been mapped. Upon receiving the requests, the interface module reads the register map database entry corresponding to the Modbus register to obtain the value of the process control parameter. The interface module formats and transmits are response to the requesting Modbus master device containing the register number and value of the process control parameter from the register map table. In order to configure the register map data base to associate the process control parameters with the Modbus registers, the interface module may include an Ethernet connection to which a user interface, such as a personal computer, may be connected. Web server software in the interface module and web browser software at the user interface may be used to provide a graphical interface for the register map database configuration process.

In one aspect of the invention, an interface module is provided for use in a process control system including a Fieldbus process control network having a plurality of Fieldbus field devices and a Modbus process control network having a plurality of Modbus field devices. The interface module may operatively connect the Fieldbus process control network to the Modbus process control network and may be adapted to facilitate the exchange of process control information between the Fieldbus process control network and the Modbus process control network. The interface module may include a Fieldbus I/O module operatively coupled to the Fieldbus process control network and adapted to transmit and receive Fieldbus protocol messages on the Fieldbus process control network, a Modbus I/O module operatively coupled to the Modbus process control network and adapted to transmit and receive Modbus protocol messages on the Modbus process control network, and a controller operatively coupled to the Fieldbus I/O module and the Modbus I/O module, with the controller including a processor and a memory operatively coupled to the processor.

The controller of the interface module may be programmed to store in the memory a register map database wherein at least one Fieldbus process control parameter of the Fieldbus process control network is associated with a Modbus register number of the Modbus process control network, and be programmed to cause the Fieldbus I/O module to request a current value of the at least one Fieldbus process control parameter from a corresponding one of the Fieldbus field devices. The controller may further be programmed to store the current value of the at least one Fieldbus process control parameter in the register map database with the associated Modbus register number, and may be programmed to cause the Modbus I/O module to transmit a response message to one of the Modbus field devices with the current value of the at least one Fieldbus process control parameter and the associated Modbus register number in response to receiving a request message from the one of the Modbus field devices at the Modbus I/O module for the current value of the associated Modbus register number.

According to another aspect of the invention, a process control system includes a Fieldbus process control network having a plurality of Fieldbus field devices, a Modbus process control network having a plurality of Modbus field devices, and an interface module operatively connecting the Fieldbus process control network to the Modbus process control network which may be adapted to facilitate the exchange of process control information between the Fieldbus process control network and the Modbus process control network. The interface module may include a Fieldbus I/O module operatively coupled to the Fieldbus process control network and adapted to transmit and receive Fieldbus protocol messages on the Fieldbus process control network, a Modbus I/O module operatively coupled to the Modbus process control network and adapted to transmit and receive Modbus protocol messages on the Modbus process control network, and a controller operatively coupled to the Fieldbus I/O module and the Modbus I/O module which may include a processor and a memory operatively coupled to the processor.

The controller may be programmed to store in the memory a register map database wherein at least one Fieldbus process control parameter of the Fieldbus process control network is associated with a Modbus register number of the Modbus process control network, and to cause the Fieldbus I/O module to request a current value of the at least one Fieldbus process control parameter from a corresponding one of the Fieldbus field devices. The controller may further be programmed to store the current value of the at least one Fieldbus process control parameter in the register map database with the associated Modbus register number, and to cause the Modbus I/O module to transmit a response message to one of the Modbus field devices with the current value of the at least one Fieldbus process control parameter and the associated Modbus register number in response to receiving a request message from the one of the Modbus field devices at the Modbus I/O module for the current value of the associated Modbus register number.

According to a still further aspect of the invention, a method of exchanging process control information between a Fieldbus process control network having a plurality of Fieldbus field devices and a Modbus process control network having a plurality of Modbus field devices may include the steps of operatively coupling an interface module to the Fieldbus process control network and to the Modbus process control network, the interface module being adapted to transmit and receive Fieldbus protocol messages on the Fieldbus process control network and to transmit and receive Modbus protocol messages on the Modbus process control network, and storing in the interface module a register map database wherein at least one Fieldbus process control parameter of the Fieldbus process control network is associated with a Modbus register number of the Modbus process control network. The method may further include causing the interface module to request a current value of the at least one Fieldbus process control parameter from a corresponding one of the Fieldbus field devices, and storing the current value of the at least one Fieldbus process control parameter in the register map database with the associated Modbus register number. Still further, the method may include the step of causing the interface module to transmit a response message to one of the Modbus field devices with the current value of the at least one Fieldbus process control parameter and the associated Modbus register number in response to receiving a request message from the one of the Modbus field devices at the interface module for the current value of the associated Modbus register number.

The features and advantages of the invention will be apparent to those of ordinary skill in the art in view of the description of the embodiments, which is made with reference to the drawings, a brief description of which is provided below.

BRIEF DESCRIPTION OF THE DRAWINGS

FIG. 3 is a portion of register map database mapping Fieldbus process control parameters to Modbus registers.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of a patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this provisional patent application, which would still fall within the scope of the claims defining the invention.

It should also be understood that, unless a term is expressly defined in this provisional patent application using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this provisional patent application.

Figure 1:
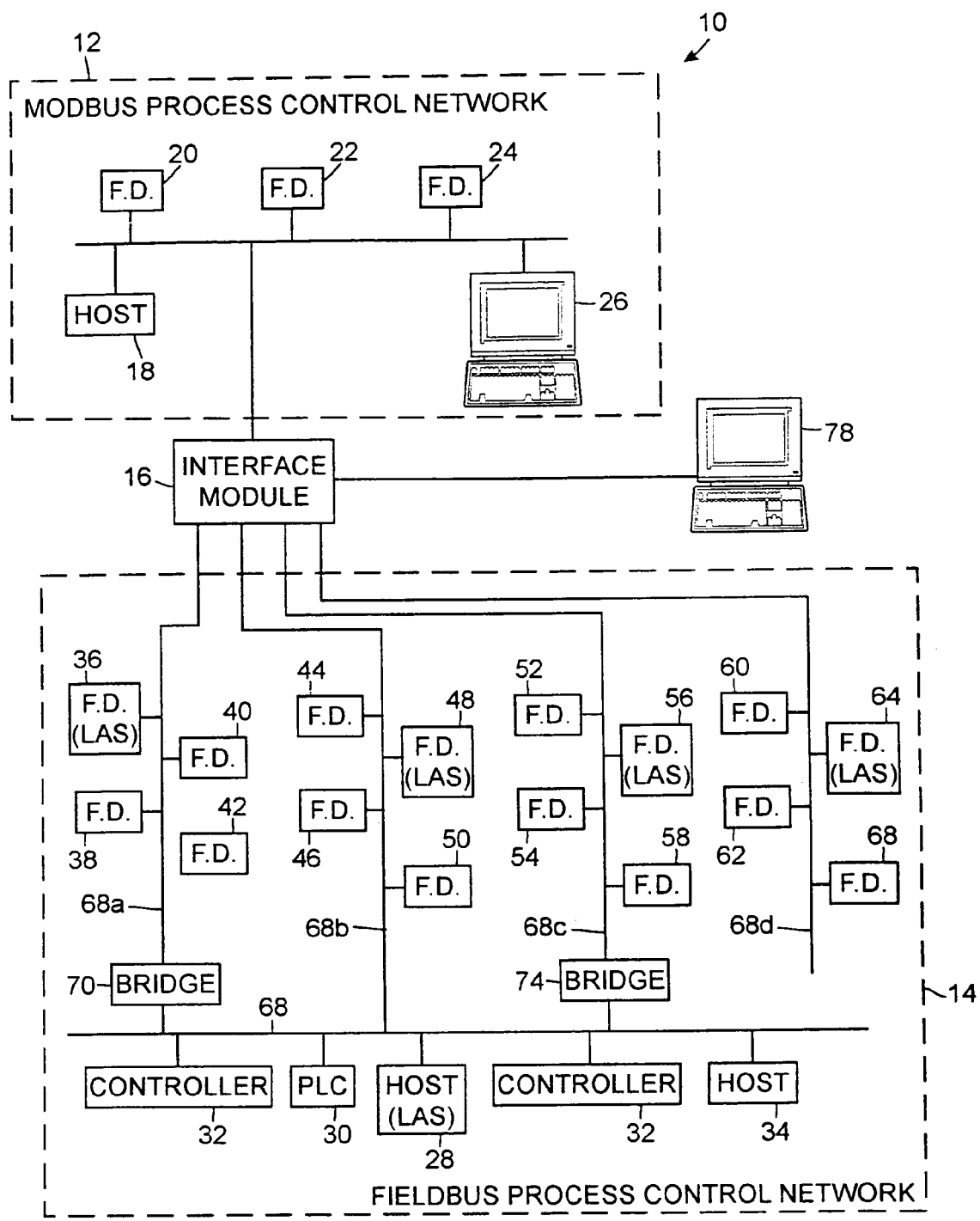
FIG. 1 is a block diagram of a process control system having a Modbus process control network connected to a Fieldbus process control network by an interface module.

Referring now to FIG. 1, a process control system 10 includes a Modbus process control network 12 connected to a Fieldbus process control network 14 by an interface module 16. The Modbus process control network 12 may include a host device or controller 18 connected to a plurality of Modbus field devices 20–24 and a user interface 26 that may function as a plant historian for the Modbus process control network 12 and/or the process control system 10. In this system, the host 18 may be used to implement process control in the Modbus process control network 12 and serve as a Modbus master device initiating transactions that are received by the devices 20–24 and user interface 26. The devices 20–24 and user interface 26 respond by supplying requested data to the host 18, or by taking action requested by the query.

The Fieldbus process control network 14 may include a host or controller 28 connected to a number of other devices such as a program logic controller (PLC) 30, a number of controllers 32, another host device 34 and a set of field devices 36–66 via a two-wire Fieldbus loop or bus 68. The Fieldbus process control network 14 may include different sections or segments, 68a, 68b, 68c and 68d. Some segments, such as segment 68b, may be connected directly to the bus 68, while other segments, such as segments 68a and 68c, may be connected to the bus 68 by bridge devices 70, 74. Still further, the Fieldbus process control network 14 may include segments, such as segment 68d, connected to the Fieldbus process control network 14 by the interface module 16. Each of the sections 68a, 68bb, 68c and 68d interconnects a subset of the devices to enable communications between the devices in a manner previously described. For communication to occur, one of the devices on each segment of the bus 68 operates as the link active scheduler (for example, controller 28 and devices 36, 48, 56 and 64) that actively schedules and controls communication on the associated segment of the bus 68.

The Modbus network 12 is connected to the Fieldbus network 14 by the interface module 16. The interface module 16 is connected to the Modbus network 12 via a Modbus-compatible input/output (I/O) port, and to nodes on one or more of the segments 68a, 68b, 68c and 68d of the Fieldbus network 14 via Fieldbus-compatible I/O ports. To facilitate communications to and from the interface module 16 in the Modbus network 12, the interface module 16 is assigned a Modbus device address, and the host 18 and other Modbus master devices, and the interface module 16 are configured so that the master devices can format and transmit messages for the interface module 16, and the interface module 16 can receive, identify and process the messages, perform the requested action, and transmit response messages to the master devices via the Modbus I/O port in the same manner as other Modbus devices.

The interface module 16 may also be configured as a link master device so that the interface module 16 may function as the link active scheduler for one or more of the segments of the Fieldbus process control network 14 attached thereto. Moreover, as previously discussed, the interface module 16 may also function as a bridge device to facilitate communications between a segment, such as segment 68d, that may not be connected directly to the bus 68 and/or the other segments 68a, 68b and 68c of the Fieldbus process control network 14.

As with the Modbus network 12, the interface module 16 is capable of communicating on the segments 68a, 68b, 68c and 68d of the bus 68 to which it is connected via the Fieldbus I/O ports. The interface module 16 is assigned a Fieldbus device address so that the interface module 16 is recognized by the devices 36–66 on the segments 68a, 68b, 68c and 68d to which it is attached. The link master schedules in the LAS devices 36, 48, 56 and 64 are configured so that pass token messages will be transmitted to the interface module 16 during the asynchronous periods of the link master schedules. The VCRs in the devices 36–66 and at the interface module 16 are configured so that the interface module 16 may transmit messages to the field devices 36–66 requesting the values of the process control parameters for which the interface module 16 is configured to store, and the field devices 36–66 may transmit response messages to the interface module 16 containing the current values of the requested Fieldbus process control parameters.

In order to configure the interface module 16 and display data compiled therein, the interface module 16 may be programmed with web server software. Configuration of the interface module 16 may be accomplished over an Ethernet I/O port using the standard web browser software available in any personal computer, such as user interface 78. Web pages provided by the web server software of the interface module 16 to the web browser software of the user interface 78 allow a process monitor or operator to map process control parameters of the devices 36–66 of the Fieldbus network 14 to registers of the Modbus network. The web pages may also allow the monitor or operator to view the current values of the Fieldbus process control parameters mapped to Modbus registers and stored in the interface module 16.

Figure 2:
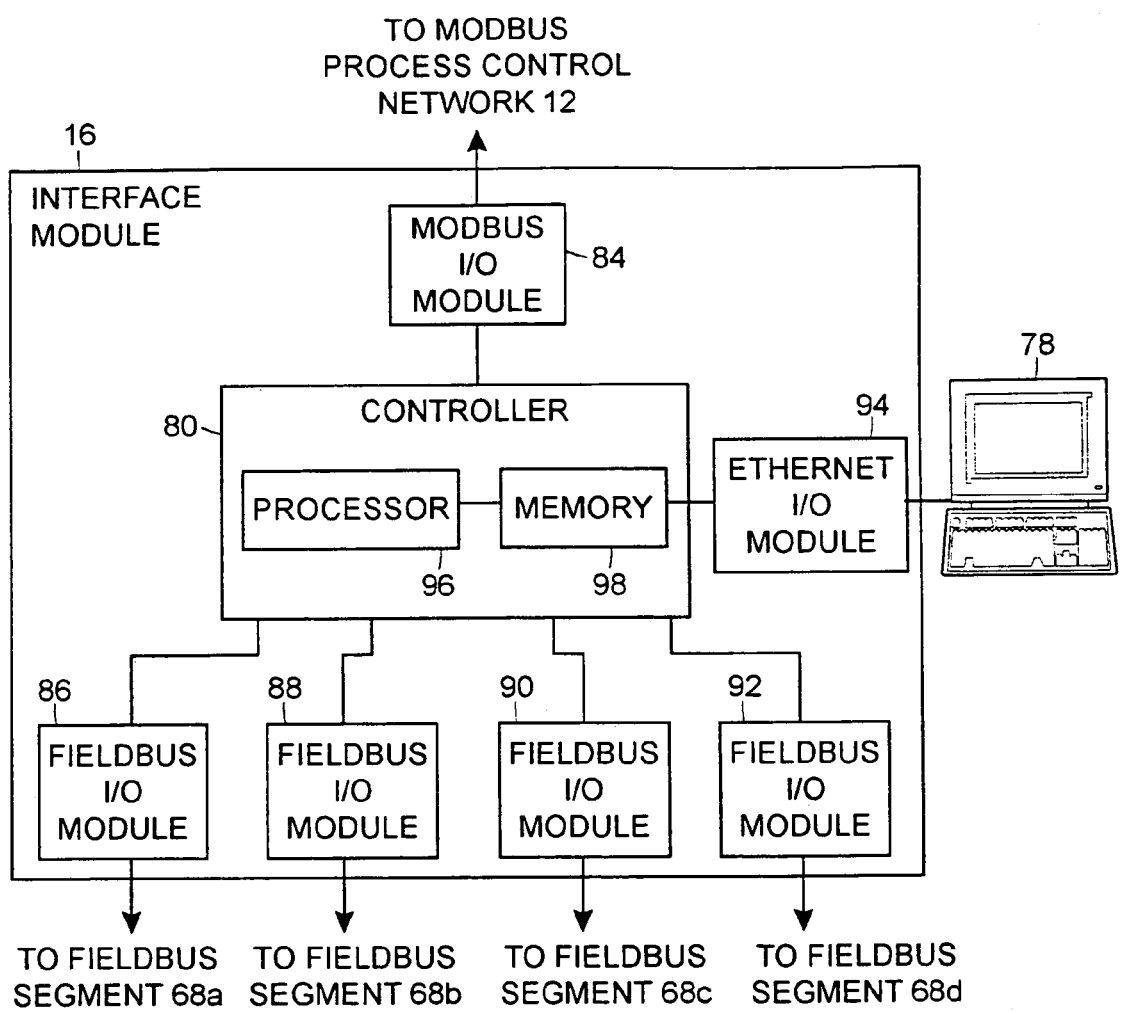
FIG. 2 is a functional block diagram of the interface module of FIG. 1.

Referring now to FIG. 2, the interface module 16 may include a controller 80 connected to memory 82, Modbus I/O module 84, Fieldbus I/O modules 86–92, and Ethernet I/O module 94. The controller 80 may be embodied in hardware that is commercially available, such as in a 16 or 32 bit, 16 megahertz (MHZ) 80C960SA microcontroller, which is commercially available from Intel, or may be embodied in any other suitable microcontroller. The controller 80 may include a processor 96 that is communicatively coupled to a memory 98 via a bus 100. The memory 98 of the controller 80 may be random access memory (RAM), read-only memory (ROM), such as a semi-conductor ROM, or any suitable combination thereof. Alternatively or additionally, the memory 98 may include any one of, or any suitable combination of, an electrically erasable programmable read-only memory (EEPROM), a one-time programmable electrically programmable read-only memory (OTP EPROM), a static random access memory (SRAM), flash or any other suitable memory element may be externally connected to the processor 96 of the controller 80. Furthermore, the memory(ies) may be embodied in other computer-readable media such as optical media, e.g., CDs, rewritable CDs, DVDs and the like, or magnetic media, e.g., floppy discs, hard drives, zip discs and the like.

The Modbus I/O module 84 connects the controller 80 to the host 18 of the Modbus network 12 using, for example, an RS485 serial port, a port for an Ethernet connection, such as a standard RJ 45/10/100bt connector, or any other suitable connection to the Modbus network known in the art. The Modbus I/O module 84 is configured to communicate with the host 18 using the Modbus protocol. For example, the Modbus I/O module 84 is configured to receive messages transmitted on the Modbus network 12, and to detect messages transmitted by the host 18 or other master devices containing the Modbus address assigned to the interface module 16. Once detected, the Modbus I/O module 84 is capable of extracting and, if necessary, reformatting the data contained in the message and transferring the information to the controller 80 for executing the request from the host 18. The Modbus I/O module 84 is further configured to receive data from the controller 80, which may be provided in response to a request from the host 18, formatting an appropriate Modbus protocol message, and transmitting the message over the Modbus network 12.

Similarly, the Fieldbus I/O modules 86–92 connect the controller 80 to the Fieldbus segments 68*a*, 68*b*, 68*c* and 68*d* using, for example, H1 I/O cards, and facilitate communications between the controller 80 and the Fieldbus field devices 36–66. One or more of the Fieldbus I/O modules 86–92 are attached to nodes of the segments 68*a*, 68*b*, 68*c* and 68*d*, respectively, and the interface module 16 is assigned a Fieldbus address to be used for communicating with the field devices 36–66 connected to the segment 68*a*, 68*b*, 68*c*, and 68*d*. The link active schedules are configured so that pass token messages for the interface module 16 are transmitted by the LAS field devices 36, 48, 56 and 64 during the asynchronous communications periods of the schedules. Fieldbus I/O modules 86, 88, 90 and 92 detect the pass token messages for the interface module 16, and any other messages for the interface module 16 transmitted on the segments 68*a*, 68*b*, 68*c* and 68*d*, and transmits the information in the messages to the controller 80 for processing. When the interface module 16 communicates with the field devices 36–66 of the Fieldbus network 14, controller 80 causes the Fieldbus I/O modules 86, 88, 90 and 92 to format Fieldbus protocol messages, and to transmit the messages on the appropriate Fieldbus segment 68*a*, 68*b*, 68*c* or 68*d*.

As previously discussed, the interface module 16 may be programmed with standard web server software so that a computer with a web browser connected thereto may be used to configure the interface module 16 and to view process control information stored therein. Ethernet I/O module 94 is connected to the controller 80 and includes a port for an Ethernet connection, such as, for example, a standard RJ 45/10/100bT connector. Depending on the particular implementation of the interface module 16, the Ethernet connection may be used to connect the interface module 16 directly to the user interface 78 or, alternatively, to a local area network wherein multiple networked devices with web browser software may be provided with access to the information contained in the interface module 16.

In one embodiment, the interface module 16 is configured to obtain and store process control information from the Fieldbus process control network 14, and to provide the stored Fieldbus process control information to the Modbus process control network 12 upon receiving a request from one of the master devices, such as the host 18, of the Modbus process control network 12. In order to allow devices in the Modbus network 12 to request the values of process control parameters used in the Fieldbus network 14, the process control parameters used in the Fieldbus network 14 are mapped to Modbus registers, with the values of the process control parameters being stored at the interface module 16 in a register map database in memory 98. Once the Fieldbus process control parameters are mapped to Modbus registers, Modbus master devices are configured to transmit messages to the interface module 16 requesting the values of the Modbus registers to which the Fieldbus process control parameters are mapped. Upon receiving the request messages at the interface module 16, the processor 96 of the controller 80 looks up values stored in the register map database in memory 98 corresponding to the register numbers in the request messages, and causes the Modbus I/O module 84 to format and transmit Modbus response messages with the register numbers and corresponding Fieldbus process control parameter values. The Modbus master devices receive and process the response messages in the same manner as any response message transmitted by a Modbus slave device.

As previously discussed, Fieldbus process control parameters are mapped to Modbus registers in a register map database stored in the memory 98 of the interface module 16. FIG. 3 illustrates one example of a register map database 100 that may be constructed at the interface module 16 and stored in the memory 98 of the controller 80. For each Fieldbus process control parameter that is mapped to a Modbus register number 102, the register map database 100 may include a segment identifier 104, a device identifier 106, a function block identifier 108 and a parameter identifier 110, along with a current value 112 of the Fieldbus process control parameter. The example of FIG. 3 illustrates one implementation of the interface module 16 in accordance with the invention wherein the master devices of the Modbus process control network 12 may be able to obtain, via the interface module 16, the output value and the output status of some or all of the function blocks of the Fieldbus process control network 14. In the register map database 100 of FIG. 3, register numbers 45,001–45,999 may be reserved to store the current output status of various Fieldbus function blocks, and register numbers 47,001–47,999 may be reserved to store the output values of the various Fieldbus function blocks. For example, in the database 100 of FIG. 3, the output status of a thermal transducer TT-01-1 of device 848-01 on segment 1 may be mapped to Modbus register number 45,001, while the output value of the thermal transducer TT-01-1 may be mapped to Modbus register number 47,001. Similarly, the output status of a pressure transducer PP-44-1 of device 3051-44 on segment 3 may be mapped to Modbus register number 45,324, while the output value of the pressure transducer PP-44-1 may be mapped to register number 47,647. Once the Fieldbus process control parameters are mapped to the Modbus registers, the master devices in the Modbus network 12 may request the current values of Fieldbus process control parameters from the interface module 16 using the corresponding register number in the manner described more fully herein. While the register map database 100 illustrated herein maps output values and output statuses of the function blocks to Modbus registers, it will be apparent to those skilled in the art that any process control parameters used by the Fieldbus devices of a Fieldbus process control network may be mapped to Modbus registers in a register map database. It will be appreciated that the Fieldbus process control parameters mapped to the Modbus registers may be determined by the requirements of process control system in which the interface module 16 is implemented.

In order to establish the register map database 100, the interface module 16 must first identify the function blocks and process control parameters existing in the field devices 36–66 of the Fieldbus network 14. As previously discussed, once the interface module 16 is connected to one or more of the segments 68a, 68b, 68c and 68d of the Fieldbus network 14 via the Fieldbus I/O modules 86–92, the link active schedules of the corresponding LAS field devices 36, 48, 56 and 64 are configured to transmit pass token messages for the interface module 16 during the asynchronous period of the schedule. When the interface module 16 receives a past token message on one of the segments 68a, 68b, 68c or 68d, the interface module 16 transmits messages on the segment to poll the corresponding field devices for information relating to their existence, the function blocks contained therein, and the process control parameters used by the function blocks. For example, when the interface module 16 is connected to segment 68a, and LAS field device 36 transmits a pass token message to the Fieldbus address of the interface module 16, the Fieldbus I/O module 86 detects the past token message and communicates to the controller 80 that the interface module 16 may transmit messages on segment 68a. The controller 80 causes the Fieldbus I/O module 86 to transmit messages on the segment 68a polling the field devices 36–42 for information pertaining to the function blocks and process control parameters contained therein. The field devices 36–42 respond by transmitting messages to the interface module 16 containing the requested information. The response messages are detected by the Fieldbus I/O module 86, which relays the information to the controller 80. The processor 96 of the controller 80 causes the information from the field devices 36–42 to be stored in memory 98 for use in constructing the register map database 100. Similar polling of the field devices 44–66 of the segment 68b, 68c and 68d, if any, to which the interface module 16 is attached will be performed by the controller 80.

Once information relating to the process control parameters of the Fieldbus network 14 has been compiled by the interface module 16, the process control parameters may be mapped to Modbus registers using the web browser of the user interface 78. Information for the available process control parameters stored in the memory 98 may be transmitted from the controller 80 through the Ethernet I/O module 94 to the to user interface 78 upon receiving a request from the user interface 78. Once displayed, the web pages provided by the web server software of the controller 80 allow the user to view the available process control parameters and to map the process control parameters to Modbus register numbers for use by the Modbus network 12. As register numbers are assigned to the process control parameters, the information may be transmitted from the user interface 78 to the interface module 16 and, after the information is received at the Ethernet I/O module 94, the processor 96 of the controller 80 may cause the register numbers to be stored in the register map database 100 in entries corresponding to the associated process control parameters.

In an alternative embodiment, the Fieldbus process control parameters may be mapped to the Modbus registers at the user interface 78 using software other than a web browser. The mapping may be performed using commercially available software applications such as, for example, the Microsoft® Excel spreadsheet program, or custom developed software applications. The software application may issue a request for information for the available process control parameters stored in the memory 98 via the Ethernet connection between the user interface 78 and the interface module 16. The processor 96 of the controller 80 may respond by retrieving the requested information stored in the memory 98 and causing the Ethernet I/O module 94 to the retrieved information to the to user interface 78 via the Ethernet connction. Once the information is received by the user interface 78 and displayed by the software application, the software application allows the user to view the information relating to the available process control parameters, and to manipulate the information to map the process control parameters to Modbus register numbers for use by the Modbus network 12. As register numbers are assigned to the process control parameters using the software application, the updated information may be transmitted from the user interface 78 to the interface module 16 and, after the information is received-at the Ethernet I/O module 94, the processor 96 of the controller 80 may cause the register numbers to be stored in the register map database 100 in entries corresponding to the associated process control parameters.

In addition to an operator manually mapping the Modbus registers to the Fieldbus process control parameters using the web browser at the user interface 78, the interface module 16 may include an automatic mapping mode whereby the controller 80 of the interface module 16 automatically assigns register numbers to the process control variables at the field devices 36–66. The automatic mapping may assign register numbers randomly or sequentially without regard to the type of parameter being mapped or, alternatively, pre-determined ranges of registers may be designated for various types of parameters that may be used in the Fieldbus network 14.

Once the process control parameters of the Fieldbus network 14 are mapped to the registers of the Modbus network 12, the host 18 and other master devices are configured to issue requests to the interface module 16 for the values of Modbus registers to which the process control parameters of the Fieldbus network 14 have been mapped. The configuration of the Modbus devices may be performed manually by an operator at a particular Modbus master device. Alternatively, the configuration process may be semi-automated by having the processor 96 of the controller 80 cause the Modbus I/O module 84 to transmit messages to the master devices of the Modbus network 12 that contain the register numbers that have been mapped to Fieldbus process control parameters. The data contained in these messages may be used by the operator to configure the Modbus master devices to issue request messages to the interface module 16 to retrieve the values associated with the mapped register numbers.

The request messages issued by the Modbus master devices include the Modbus device address for the interface module 16, a function code requesting the interface module 16 to read the value of a register or registers, and the register number or numbers to be read by the interface module 16. The request messages are received at the Modbus I/O module 84, which decodes the request message and communicates the requests to the controller 80. Upon receiving the request, the processor 96 of the controller 80 reads the register map database 100 stored in the memory 98 to retrieve the values of the process control parameters corresponding to the register number or numbers requested by the Modbus master devices. Once the value or values have been retrieved, the processor 96 causes the Modbus I/O module 84 to format and transmit a Modbus response message or messages containing the values stored in the register map database 100 to the requesting master device or devices.

In order to insure that the register map database 100 includes current values of the Fieldbus process control parameters stored therein, the processor 96 of the controller 80 may cause the Fieldbus I/O modules 86–92 to transmit Fieldbus request messages to the field devices 36–66. Upon receiving pass token messages on the corresponding segment 68*a*, 68*b*, 68*c* and 68*d*, the Fieldbus I/O modules 86–92 may transmit messages to each of the field devices 36–66 for which at least one process control parameter has been mapped to a Modbus register. These messages may be transmitted each time a pass token message is received, or may be transmitted less frequently depending on the type of process control parameter or field device, or on the message transmission volume limitations of the Fieldbus network 14. Alternatively, upon receiving a request from a Modbus master device for the current value of a Modbus register, the controller 80 may be configured to cause the corresponding one of the Fieldbus I/O modules 86–92 to transmit a request to the appropriate one of the field devices 36–66 for the current value of the process control parameter. Once the one of the field devices 36–66 responds with the requested process control parameter value, the processor 96 may update the register map database 100 with the new value and cause the Modbus I/O module 84 to transmit the appropriate response message to the requesting Modbus master device.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An interface module for use in a process control system including a Fieldbus process control network having a plurality of Fieldbus field devices and a Modbus process control network having a plurality of Modbus field devices, the interface module operatively connecting the Fieldbus process control network to the Modbus process control network and configured to facilitate the exchange of process control information between the Fieldbus process control network and the Modbus process control network, the interface module comprising:

a Fieldbus I/O module operatively coupled to the Fieldbus process control network and configured to transmit and receive Fieldbus protocol messages on the Fieldbus process control network;

a Modbus I/O module operatively coupled to the Modbus process control network and configured to transmit and receive Modbus protocol messages on the Modbus process control network; and a controller operatively coupled to the Fieldbus I/O module and the Modbus I/O module, the controller comprising a processor and a memory operatively coupled to the processor, the controller being programmed to store in the memory a register map table containing information for Fieldbus process control parameters of the Fieldbus process control network that are mapped to corresponding Modbus register numbers of the Modbus process control network, wherein the register map table includes a record for each Fieldbus process control parameter mapped to a Modbus register number, and wherein each record in the register map table includes information identifying the Fieldbus process control parameter, a value of the Fieldbus process control parameter, and the Modbus register number to which the Fieldbus process control parameter is mapped, the controller being programmed to cause the Modbus I/O module to receive Modbus request messages from the Modbus field devices on the Modbus process control network, wherein the Modbus request messages request the values of Modbus register numbers stored in the register map database the controller being programmed to cause the Modbus I/O module to transmit Modbus response messages to the requesting Modbus field devices with the current values of the requested Modbus register numbers stored in the register map table and the associated Modbus register numbers in response to receiving the Modbus request messages from the Modbus field devices at the Modbus I/O module, the controller being programmed to cause the Fieldbus I/O module to transmit Fieldbus request messages on the Fieldbus process control network, wherein the Fieldbus request messages request the current values of Fieldbus process control parameters from the corresponding Fieldbus field devices, and wherein the Fieldbus request messages are not transmitted in response to receiving Modbus request messages at the Modbus I/O module requesting the values of the corresponding Modbus register numbers stored in the register database, and the controller being programmed to cause the Fieldbus I/O module to receive Fieldbus response messages from the Fieldbus field devices containing the current values of the Fieldbus process control parameters, and being programmed to store the current values of the Fieldbus process control parameters from the Fieldbus response messages in the corresponding records of the register map table.

2. The interface module of claim 1, wherein the controller is programmed to cause the Fieldbus I/O module to transmit Fieldbus request messages using queued, unscheduled communications on each occurrence of receiving a pass token message at the Fieldbus I/O module from the Fieldbus process control network.

3. The interface module of claim 1, wherein the controller is programmed to cause the Fieldbus I/O module to transmit Fieldbus request messages after a predetermined period of time elapses after the Fieldbus I/O module transmitted a previous Fieldbus request message for the current values of Fieldbus process control parameters.

4. The interface module of claim 1, wherein the Fieldbus process control network includes a plurality of segments each having at least one Fieldbus field device operatively coupled thereto, the interface module comprising a plurality of Fieldbus I/O modules each being operatively coupled to the controller and one of the segments of the Fieldbus process control network, each Fieldbus I/O module being adapted to transmit and receive Fieldbus protocol messages on the corresponding segment, the controller being programmed to cause the Fieldbus I/O module operatively coupled to the segment to which a Fieldbus field device is operatively coupled to transmit Fieldbus request messages for current values of the Fieldbus process control parameters stored in the Fieldbus field device.

5. The interface module of claim 1, comprising an Ethernet I/O module operatively coupled to the controller and to a user interface, and being adapted to transmit Ethernet protocol messages to and receive Ethernet protocol messages from the user interface.

6. The interface module of claim 5, wherein the user interface is programmed to function as a web browser and the controller is programmed to function as a web server.

7. The interface module of claim 5, wherein the controller is programmed to cause the Ethernet I/O module to transmit information relating to the Fieldbus process control parameters stored in the register map table to the user interface in response to receiving a request message from the user interface at the Ethernet I/O module.

8. The interface module of claim 5, wherein the controller is programmed to update the register map table in the memory to associate a Fieldbus process control parameter of the Fieldbus process control network with a Modbus register number of the Modbus process control network in response to receiving a register map table update message from the user interface at the Ethernet I/O module.

9. The interface module of claim 5, wherein the controller is programmed to cause the Ethernet I/O module to transmit a response message to the user interface with the current values of the Fieldbus process control parameters, information relating to the Fieldbus process control parameters, and the associated Modbus register numbers in response to receiving a request message from the user interface at the Ethernet I/O module for the register map table.

10. A process control system comprising:
a Fieldbus process control network having a plurality of Fieldbus field devices;
a Modbus process control network having a plurality of Modbus field devices; and
an interface module operatively connecting the Fieldbus process control network to the Modbus process control network and configured to facilitate the exchange of process control information between the Fieldbus process control network and the Modbus process control network, the interface module comprising:
a Fieldbus I/O module operatively coupled to the Fieldbus process control network and configured to transmit and receive Fieldbus protocol messages on the Fieldbus process control network,
a Modbus I/O module operatively coupled to the Modbus process control network and configured to transmit and receive Modbus protocol messages on the Modbus process control network, and
a controller operatively coupled to the Fieldbus I/O module and the Modbus I/O module, the controller comprising a processor and a memory operatively coupled to the processor,
the controller being programmed to store in the memory a register map table containing information for Fieldbus process control parameters of the Fieldbus process control network that are mapped to corresponding Modbus register numbers of the Modbus process control network, wherein the register map table includes a record for each Fieldbus process control parameter mapped to a Modbus register number, and wherein each record in the register map table includes information identifying the Fieldbus process control parameter, a value of the Fieldbus process control parameter, and the Modbus register number to which the Fieldbus process control parameter is mapped, the controller being programmed to cause the Modbus I/O module to receive Modbus request messages from the Modbus field devices on the Modbus process control network, wherein the Modbus request messages request the values of Modbus register numbers stored in the register map database, the controller being programmed to cause the Modbus I/O module to transmit Modbus response messages to the requesting Modbus field devices with the current values of the requested Modbus register numbers stored in the register map table and the associated Modbus register numbers in response to receiving the Modbus request messages from the Modbus field devices at the Modbus I/O module, the controller being programmed to cause the Fieldbus I/O module to transmit Fieldbus request messages on the Fieldbus process control network, wherein the Fieldbus request messages request the current values of Fieldbus process control parameters from the corresponding Fieldbus field devices, and wherein the Fieldbus request messages are not transmitted in response to receiving .Modbus request messages at the Modbus I/O module requesting the values of the corresponding Modbus register numbers stored in the register database, and the controller being programmed to cause the Fieldbus I/O module to receive Fieldbus response messages from the Fieldbus field devices containing the current values of the Fieldbus process control parameters, and being programmed to store the current values of the Fieldbus process control parameters from the Fieldbus response messages in the corresponding records of the register map.

11. The process control system of claim 10, wherein the controller of the interface module is programmed to cause the Fieldbus I/O module to transmit Fieldbus request messages using queued, unscheduled communications on each occurrence of receiving a pass token message at the Fieldbus I/O module from the Fieldbus process control network.

12. The process control system of claim 10, wherein the controller of the interface module is programmed to cause the Fieldbus I/O module to transmit Fieldbus request messages after a predetermined period of time elapses after the Fieldbus I/O module transmitted a previous Fieldbus request message for the current values of Fieldbus process control parameters.

13. The process control system of claim 10, wherein the Fieldbus process control network includes a plurality of segments each having at least one Fieldbus field device operatively coupled thereto, and wherein the interface module comprises a plurality of Fieldbus I/O modules each being operatively coupled to the controller and one of the segments of the Fieldbus process control network, each Fieldbus I/O module being adapted to transmit and receive Fieldbus protocol messages on the corresponding segment, the controller being programmed to cause the Fieldbus I/O module operatively coupled to the segment to which a Fieldbus field device is operatively coupled to transmit Fieldbus request messages for current values of the Fieldbus process control parameters stored in the Fieldbus field device.

14. The process control system of claim 10, wherein the interface module comprises an Ethernet I/O module operatively coupled to the controller, the process control system comprising a user interface operatively coupled to the Ethernet I/O module, the Ethernet I/O module being adapted to transmit Ethernet protocol messages to and receive Ethernet protocol messages from the user interface.

15. The process control system of claim 14, wherein the user interface is programmed to function as a web browser and the controller is programmed to function as a web server.

16. The process control system of claim 14, wherein the controller is programmed to cause the Ethernet I/O module to transmit information relating to the Fieldbus process control parameters stored in the register map table to the user interface in response to receiving a request message from the user interface at the Ethernet I/O module.

17. The process control system of claim 14, wherein the controller is programmed to update the register map table in the memory to associate a Fieldbus process control parameter of the Fieldbus process control network with a Modbus register number of the Modbus process control network in response to receiving a register map table update message from the user interface at the Ethernet I/O module.

18. The process control system of claim 14, wherein the controller is programmed to cause the Ethernet I/O module to transmit a response message to the user interface with the current values of the Fieldbus process control parameters, information relating to the Fieldbus process control parameters, and the associated Modbus register numbers in response to receiving a request message from the user interface at the Ethernet I/O module for the register map table.

19. A method of exchanging process control information between a Fieldbus process control network having a plurality of Fieldbus field devices and a Modbus process control network having a plurality of Modbus field devices, the method including the steps of:
    operatively coupling an interface module to the Fieldbus process control network and to the Modbus process control network, the interface module configured to transmit and receive Fieldbus protocol messages on the Fieldbus process control network and to transmit and receive Modbus protocol messages on the Modbus process control network;
    storing in the interface module a register map table containing information for Fieldbus process control parameters of the Fieldbus process control network is that are mapped to corresponding Modbus register numbers of the Modbus process control network, wherein the register map table includes a record for each Fieldbus process control parameter mapped to a Modbus register number, and wherein each record in the register map table includes information identifyina the Fieldbus process control parameter, a value of the Fieldbus process control parameter, and the Modbus register number to which the Fieldbus process control parameter is mapped,
    causing the interface module to receive Modbus request messages from the Modbus field devices on the Modbus process control network, wherein the Modbus request messages request the values of Modbus register numbers stored in the register map database,
    causing the interface module to transmit Modbus response messages to the requesting Modbus field devices with the current values of the requested Modbus register numbers stored in the register map table and the associated Modbus register numbers in response to receiving a the Modbus request messages from the Modbus field devices at the interface module,
    causing the interface module to transmit Fieldbus request messages on the Fieldbus process control network, wherein the Fieldbus request messages request the current values of Fieldbus process control parameters from the corresponding Fieldbus field devices, and wherein the Fieldbus request messages are not transmitted in response to receiving Modbus request messages at the interface module requesting the values of the corresponding Modbus register numbers stored in the register database,
    causing the interface module to receive Fieldbus response messages from the Fieldbus field devices containing the current values of the Fieldbus process control parameters, and
    storing the current values of the Fieldbus process control parameters from the Fieldbus response messages in the corresponding records of the register map table.

20. The method of claim 19, further including the step of causing the interface module to transmit Fieldbus request messages using queued, unscheduled communications on each occurrence of receiving a pass token message at the interface module from the Fieldbus process control network.

21. The method of claim 19, further including the step of causing the interface module to transmit Fieldbus request messages after a predetermined period of time elapses after the interface module transmitted a previous Fieldbus request message for the current values of Fieldbus process control parameters.

22. The method of claim 19, wherein the Fieldbus process control network includes a plurality of segments each having at least one Fieldbus field device operatively coupled thereto, the method further including the steps of:
    operatively coupling the interface module to the segments of the Fieldbus process control network; and
    causing the interface module to transmit Fieldbus request messages for current values of Fieldbus process control parameters on the segments to which the corresponding Fieldbus field devices are operatively coupled.

23. The method of claim 19, further comprising the step of operatively coupling the interface module to a user interface, the interface module being adapted to transmit Ethernet protocol messages to and receive Ethernet protocol messages from the user interface.

24. The method of claim 23, wherein the user interface is programmed to function as a web browser and the interface module is programmed to function as a web server.

25. The method of claim 23, further including the step of causing the interface module to transmit information relating to the Fieldbus process control parameters stored in the register map table to the user interface in response to receiving a request message from the user interface at the interface module.

26. The method of claim 23, further including the step of updating the register map table in the memory to associate a Fieldbus process control parameter of the Fieldbus process control network with a Modbus register number of the Modbus process control network in response to receiving a register map table update message from the user interface at the interface module.

27. The method of claim 23, further including the step of causing the interface module to transmit a response message to the user interface with the current values of the Fieldbus process control parameters, information relating to the Fieldbus process control parameters, and the associated Modbus register numbers in response to receiving a request message from the user interface at the interface module for the register map table.

* * * * *